United States Patent
Si et al.

(10) Patent No.: US 10,142,682 B2
(45) Date of Patent: Nov. 27, 2018

(54) IMAGE DISPLAY DEVICE AND METHOD FOR OPERATING SAME

(71) Applicant: LG ELECTRONICS INC., Seoul (KR)

(72) Inventors: Euihwan Si, Seoul (KR); Sangjin Kim, Belmont, CA (US); Hyeongho Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/544,233

(22) PCT Filed: Mar. 4, 2015

(86) PCT No.: PCT/KR2015/002107
§ 371 (c)(1),
(2) Date: Jul. 17, 2017

(87) PCT Pub. No.: WO2016/114447
PCT Pub. Date: Jul. 21, 2016

(65) Prior Publication Data
US 2018/0041803 A1 Feb. 8, 2018

(30) Foreign Application Priority Data
Jan. 16, 2015 (KR) .......................... 10-2015-008016

(51) Int. Cl.
*H04N 1/40* (2006.01)
*H04N 21/4402* (2011.01)
(Continued)

(52) U.S. Cl.
CPC ....... *H04N 21/440218* (2013.01); *H01Q 1/22* (2013.01); *H04N 5/50* (2013.01);
(Continued)

(58) Field of Classification Search
CPC .......... H01Q 1/22; H04N 5/76; H04N 21/414; H04N 21/41407; H04N 21/43637; H04N 21/42206
See application file for complete search history.

(56) References Cited

U.S. PATENT DOCUMENTS

2011/0078749 A1  3/2011  Wieck
2014/0223496 A1*  8/2014  Sasaki ................ H04N 21/4126
725/62

FOREIGN PATENT DOCUMENTS

KR  10-2002-0022667 A  3/2002
KR  10-2009-0126481 A  12/2009
(Continued)

*Primary Examiner* — Moustapha Diaby
(74) *Attorney, Agent, or Firm* — Lee, Hong, Degerman, Kang & Waimey PC

(57) ABSTRACT

An image display device includes an antenna built in the image display device to receive a broadcast service signal, a display unit configured to display a screen corresponding to the received broadcast service signal, and a controller configured to determine whether reception sensitivity of the broadcast service signal received through the antenna is equal to or less than reference sensitivity, to acquire broadcast reception information for receiving the broadcast service signal upon determining that the reception sensitivity of the received broadcast service signal is equal to or less than the reference sensitivity, and to display a position of the antenna corresponding to the acquired broadcast reception information on the display unit.

20 Claims, 20 Drawing Sheets

(51) Int. Cl.
*H04N 21/414* (2011.01)
*H01Q 1/22* (2006.01)
*H04N 5/64* (2006.01)
*H04N 21/422* (2011.01)
*H04N 21/4363* (2011.01)
*H04N 5/50* (2006.01)
*H01Q 1/24* (2006.01)
*H04N 5/445* (2011.01)

(52) U.S. Cl.
CPC .............. *H04N 5/64* (2013.01); *H04N 21/414* (2013.01); *H04N 21/42206* (2013.01); *H04N 21/43637* (2013.01); *H01Q 1/24* (2013.01); *H04N 2005/44517* (2013.01)

(56) References Cited

FOREIGN PATENT DOCUMENTS

| | | |
|---|---|---|
| KR | 10-2011-0023250 A | 3/2011 |
| KR | 10-2011-0069638 A | 6/2011 |

* cited by examiner

FIG. 5
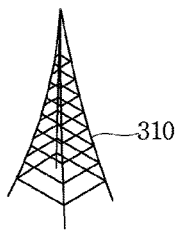
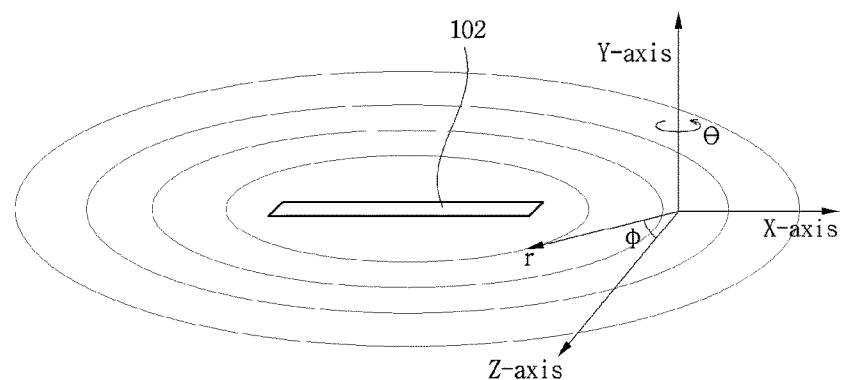
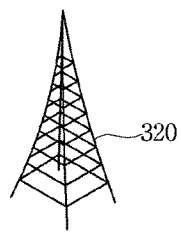
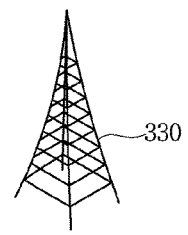

Peak Gain for UHF frequencies
inits in dBi, without amplifier

IMAGE DISPLAY DEVICE AND METHOD FOR OPERATING SAME

CROSS-REFERENCE TO RELATED APPLICATIONS

This application is the National Stage filing under 35 U.S.C. 371 of International Application No. PCT/KR2015/002107, filed on Mar. 4, 2015, and also claims the benefit of earlier filing date and right of priority to Korean Patent Application No. 10-2015-0008016, filed on Jan. 16, 2015, the contents of which are all hereby incorporated by reference herein in their entirety.

BACKGROUND OF THE INVENTION

1. Field of the Invention

The present invention relates to an image display device and a method of operating the same and, more particularly, to an image display device for receiving a broadcast service signal using an antenna mounted therein and a method of operating the same.

2. Description of the Related Art

Recently, digital TV services using wired or wireless communication networks have come into widespread use. Digital TV services may provide various services which cannot be provided by conventional analog broadcasting.

For example, an Internet protocol television (IPTV) service, as a digital TV service, provides interactivity for enabling a user to actively select a program kind, a viewing time, etc. The IPTV service may provide various supplementary services such as Internet search, home shopping, online games, etc. based on such interactivity.

Meanwhile, recently, digital TVs can receive various broadcast services such as a broadcast service provided through a cable and a broadcast service provided through a satellite, in addition to a public TV service.

Since various broadcast service providers provide characteristic services, users subscribe to paid broadcast services in order to use desired broadcast services. Recently, the number of users who use paid broadcast services is gradually increasing.

Meanwhile, a paid broadcast service generally provides a broadcast service through a cable or a satellite rather than a general over-the-air transmission method, such that only service subscribers can use the paid broadcast service.

The number of homes, in which an antenna is installed in order to receive a free-of-charge broadcast service signal, has significantly declined.

However, since broadcast service providers using an Over The Air (OTA) scheme provide a variety of interesting broadcast content, users who use paid broadcast services tend to use a public TV service.

However, installing an outdoor antenna may cause troublesomeness and installation costs. In addition, an indoor antenna or an antenna attached to a TV may be aesthetically displeasing and directivity may be caused due to damage of antenna radiation pattern.

Accordingly, there is a need for an image display device having an antenna having a high wave reception rate, which is capable of easily receiving a broadcast service signal transmitted using the OTA scheme without spoiling the beauty of an indoor space in which a TV is installed.

SUMMARY OF THE INVENTION

Therefore, the present invention has been made in view of the above problems, and it is an object of the present invention to provide an image display device including an omnidirectional antenna mounted therein to increase reception sensitivity of a broadcast service signal.

It is another object of the present invention to provide a movable built-in antenna.

It is another object of the present invention to provide broadcast service signal reception information to place an antenna installed in an image display device at an optimal position.

In accordance with an aspect of the present invention, the above and other objects can be accomplished by the provision of an image display device including an antenna built in the image display device to receive a broadcast service signal, a display unit configured to display a screen corresponding to the received broadcast service signal, and a controller configured to determine whether reception sensitivity of the broadcast service signal received through the antenna is equal to or less than reference sensitivity, to acquire broadcast reception information for receiving the broadcast service signal upon determining that the reception sensitivity of the received broadcast service signal is equal to or less than the reference sensitivity, and to display a position of the antenna corresponding to the acquired broadcast reception information on the display unit.

In accordance with another aspect of the present invention, there is provided a method of operating an image display device including receiving a broadcast service signal through an antenna built in the image display device, determining whether reception sensitivity of the received broadcast service signal is equal to or less than reference sensitivity, acquiring broadcast reception information for receiving the broadcast service signal upon determining that the reception sensitivity of the received broadcast service signal is equal to or less than the reference sensitivity, and displaying a position of the antenna corresponding to the acquired broadcast reception information.

BRIEF DESCRIPTION OF THE DRAWINGS

FIG. 5 is a diagram showing the concept of a radiation pattern of an antenna of an image display device according to an embodiment of the present invention on a spherical coordinate system.

DETAILED DESCRIPTION OF THE PREFERRED EMBODIMENTS

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

An image display device according to an embodiment of the present invention, for example, as an artificial display device that adds a computer supporting function to a broadcast receiving function, can have an easy-to-use interface such as a writing input device, a touch screen, or a spatial remote controller as an internet function is added while fulfilling the broadcast receiving function. Then, with the support of a wired or wireless internet function, it is possible to perform an e-mail, web browsing, banking, or game function in access to Internet and computers. In order for such various functions, standardized general purpose OS can be used.

Accordingly, since various applications are freely added or deleted on a general purpose OS kernel, an image display device described in this present invention, for example, can perform various user-friendly functions. The image display device, in more detail, can be network TV, HBBTV, smart TV, LED TV, OLED TV, and so on and in some cases, can be applied to a smartphone.

Figure 1:
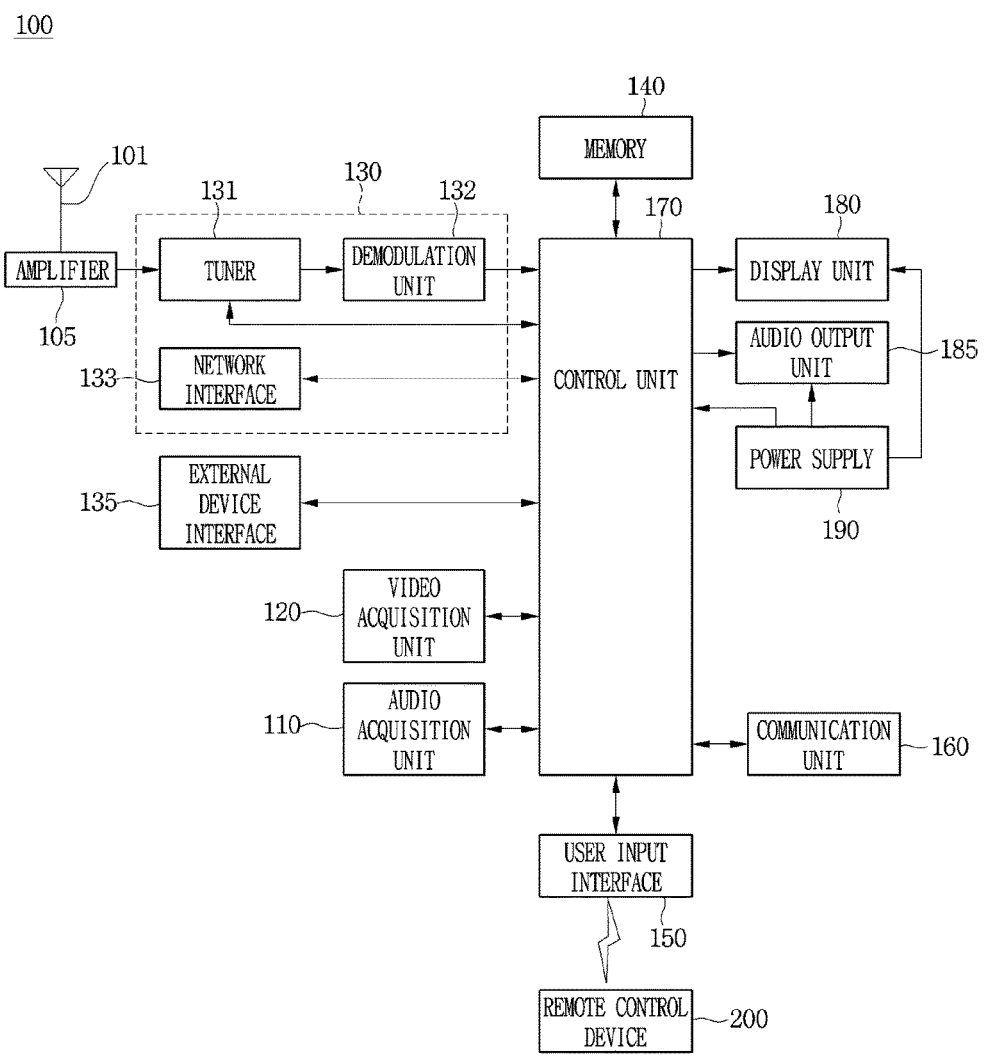
FIG. 1 is a block diagram showing the configuration of an image display device according to an embodiment of the present invention.

FIG. 1 is a block diagram illustrating a configuration of an image display device according to an embodiment of the present invention.

Referring to FIG. 1, the image display device 100 may include an antenna 101, an amplifier 105, an audio acquisition unit 110, a video acquisition unit 120, a broadcast reception unit 130, an external device interface 135, a memory 140, a user input interface 150, a communication unit 160, a control unit 170, a display unit 180, an audio output unit 185 and a power supply 190.

In addition, the image display device 100 may include a case 108 covering all or portions of lateral sides or rear sides of the antenna 101, the amplifier 105, the audio acquisition unit 110, the video acquisition unit 120, the broadcast reception unit 130, the external device interface 135, memory 140, the user input interface 150, the communication unit 160, the control unit 170, the display unit 180, the audio output unit 185 and the power supply 190.

Here, the case 108 may include a plurality of covers. The plurality of covers may be coupled to configure one case 108. For example, the case 108 may include an upper case, a lateral case, a lower case, a front case and a rear case.

The antenna 101 may receive a broadcast service signal.

For example, the antenna 101 may receive a very high frequency (VHF) or ultra high frequency (UHF) broadcast service signal.

The antenna 101 may be built in the image display device 100.

The antenna 101 may be provided at one or a plurality of side surfaces of the image display device 100 to receive a broadcast service signal.

For example, the antenna 101 may include one or more of an upper antenna 102, a left antenna 103 and a right antenna 104 according to position.

Here, one or a plurality of side surfaces of the image display device 100 may mean the bezel of the image display device 100. Therefore, the antenna 101 may be included in the bezel of the image display device 100.

In addition, the antenna 101 may be included in a portion of the case 108 of the image display device 100.

In addition, the antenna 101 may be located between the case 108 of the image display device 100 and an inner substrate.

In one embodiment, the antenna 101 may be located at an upper side of the image display device 100.

This will be described with reference to FIG. 2.

Figure 2:
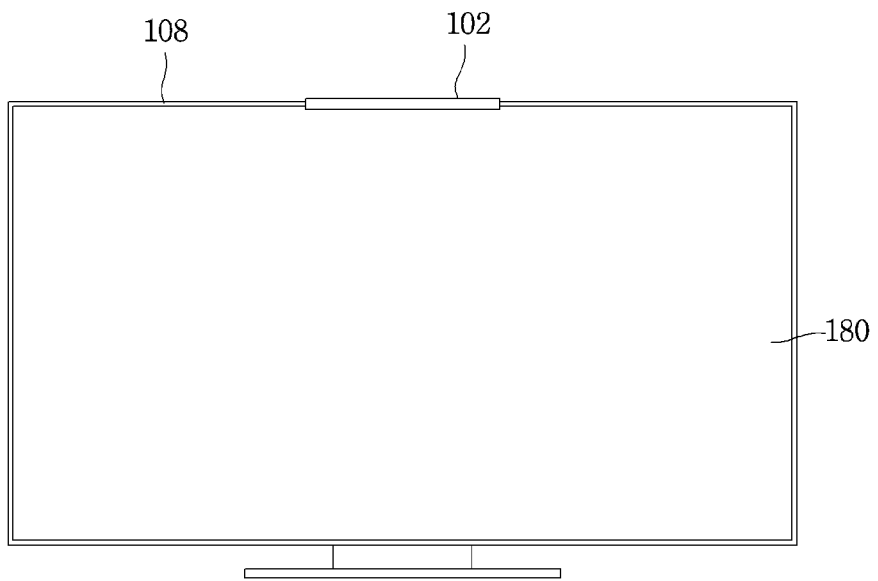
FIG. 2 is a diagram showing an upper antenna provided at an upper side of an image display device according to an embodiment of the present invention.

FIG. 2 is a diagram showing an upper antenna provided at an upper side of an image display device according to an embodiment of the present invention.

Referring to FIG. 2, the upper antenna 102 may be located at the upper end of the image display device 100. For example, the upper antenna 102 may be provided at the upper surface of the case 108 covering the image display device 100.

In another embodiment, the antenna 101 may be located at one side surface of the image display device 100.

This will be described with reference to FIG. 3.

Figure 3:
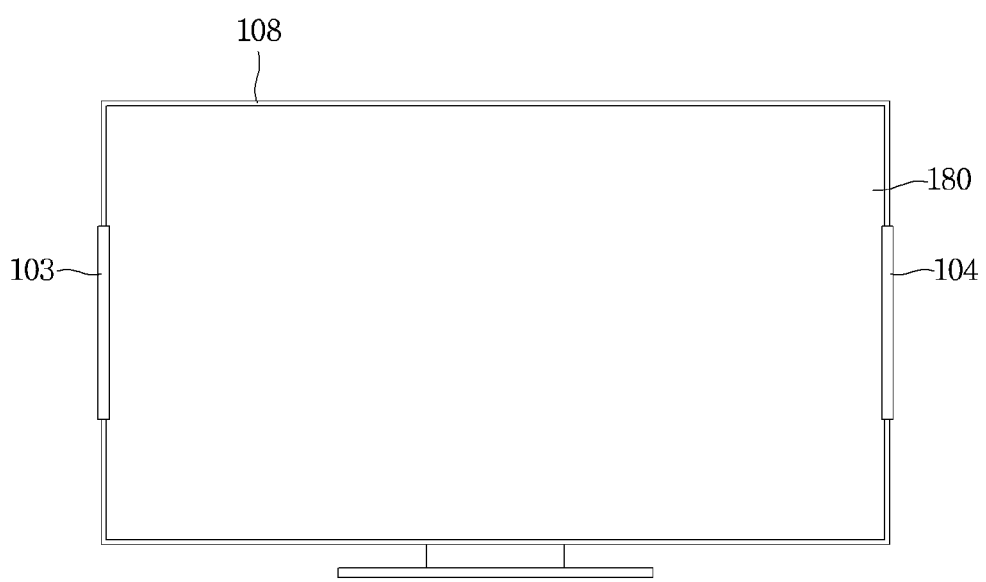
FIG. 3 is a diagram showing a left antenna and a right antenna provided at side surfaces of an image display device according to an embodiment of the present invention.

FIG. 3 is a diagram showing a left antenna and a right antenna provided at side surfaces of an image display device according to an embodiment of the present invention.

Referring to FIG. 3, the left antenna 103 may be located at the left surface of the image display device 100. For example, the left antenna 103 may be provided at the left surface of the case 108 covering the image display device 100. In addition, the right antenna 104 may be located at the right surface of the image display device 100. For example, the right antenna 104 may be provided at the right surface of the case 108 covering the image display device 100.

Meanwhile, the antenna 101 may be provided at one or the plurality of side surfaces of the image display device 100 to have omnidirectionality. Omnidirectionality is also referred to as non-directionality.

This will now be described in detail.

Figure 4:
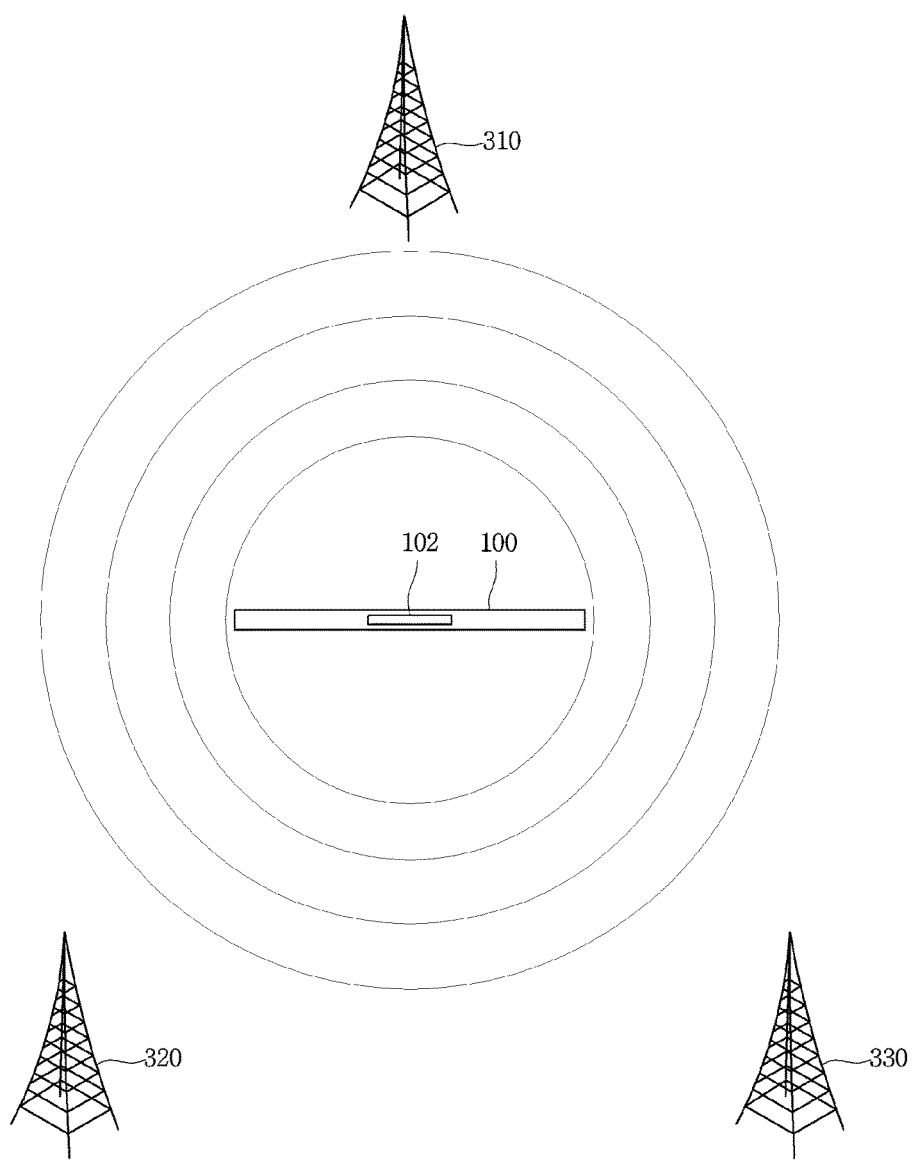
FIG. 4 is a diagram showing the concept of a radiation pattern of an antenna of an image display device according to an embodiment of the present invention.

FIG. 4 is a diagram showing the concept of a radiation pattern of an antenna of an image display device according to an embodiment of the present invention.

Referring to FIG. 4, the upper antenna 102 of the image display device 100 may maintain a constant radiation pattern without annihilation. Therefore, the upper antenna 102 may receive broadcast service signals delivered in all directions. The upper antenna 102 may receive broadcast service signals transmitted by transmission towers located in various directions. For example, the upper antenna 102 may receive broadcast service signals from a first transmission tower 310, a second transmission tower 320 and a third transmission tower 330 located at different positions.

This will be described in detail with reference to FIG. 5.

FIG. 5 is a diagram showing the concept of a radiation pattern of an antenna of an image display device according to an embodiment of the present invention on a spherical coordinate system.

Referring to FIG. 5, the upper antenna 102 has an omnidirectional radiation pattern having uniform gain in a θ direction of the spherical coordinate system. The upper antenna 102 may receive the broadcast service signals from the first transmission tower 310, the second transmission tower 320 and the third transmission tower 330 located at different positions.

Here, the θ direction may be a direction rotated from a Y-axis of the spherical coordinate system or a direction parallel to an x-axis. The concept of FIG. 5 is the radiation pattern of the upper antenna 102 when a boundary condition of an indoor or outdoor space where the image display device 100 is located is ignored.

More specifically, when an angle between a segment r of the spherical coordinate system and a Z-axis is Φ, the upper antenna 102 has an omnidirectional radiation pattern having uniform gain in the θ direction without influence of the segment r or the angle Φ. This is because the upper antenna 102 is located at the upper end of the image display device 100 and thus is not influenced by the segment r or the angle Φ unless the image display device 100 is tilted in any one of front, rear, left and right directions. The upper antenna 102 may have the omnidirectional radiation pattern in the θ direction.

Meanwhile, the left antenna 103 and the right antenna 104 may have omnidirectionality. This will be described in detail with reference to FIG. 6.

Figure 6:
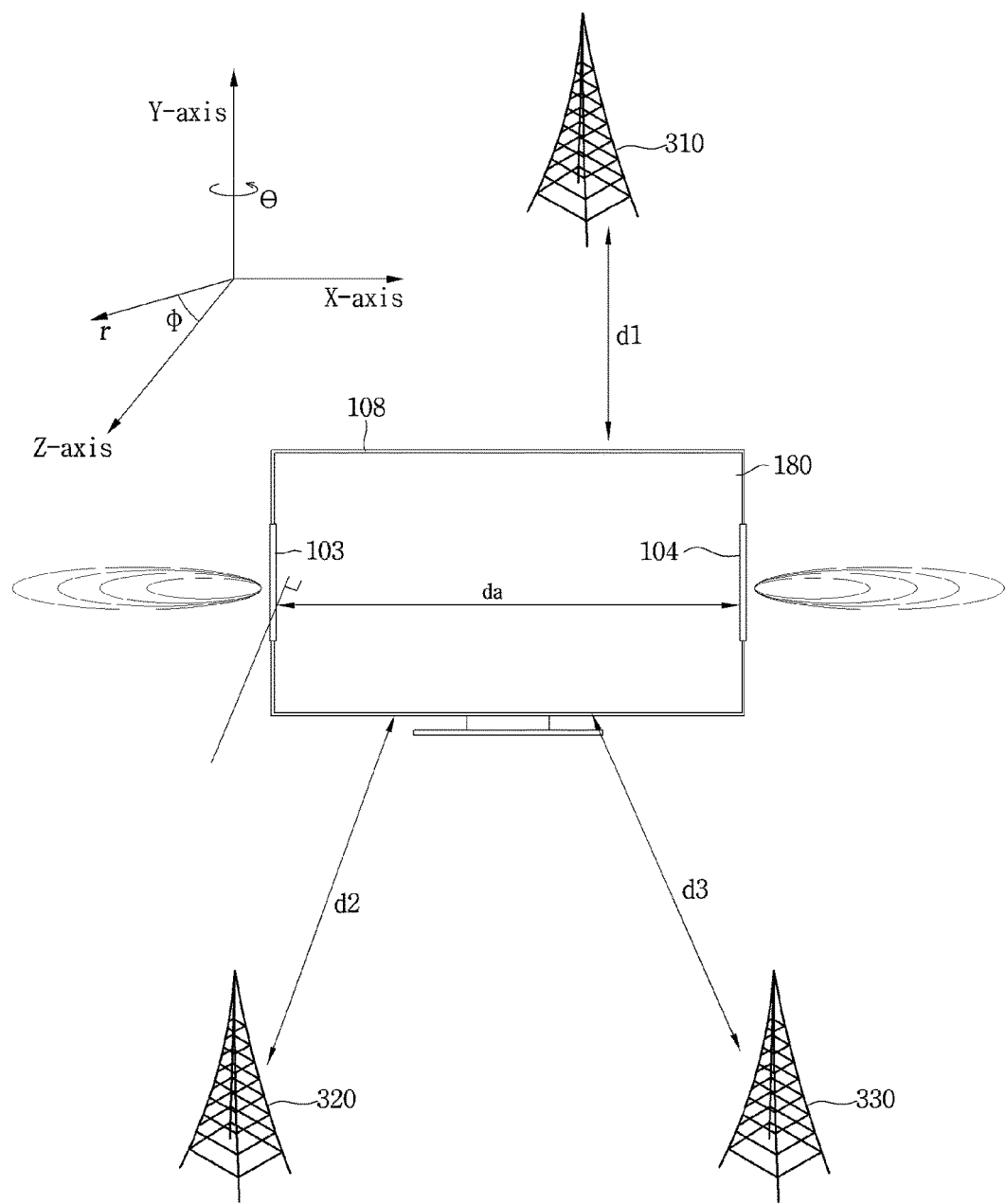
FIG. 6 is a diagram showing the concept of a radiation pattern of an antenna of an image display device according to another embodiment of the present invention.

FIG. 6 is a diagram showing the concept of a radiation pattern of an antenna of an image display device according to another embodiment of the present invention.

Referring to FIG. 6, the left antenna 103 and the right antenna 104 of the image display device 100 have respective omnidirectional radiation patterns in a normal direction of the image display device 100. The left antenna 103 and the right antenna 104 may receive the broadcast service signals from the first transmission tower 310, the second transmission tower 320 and the third transmission tower 330 located at different positions.

In addition, although the left antenna 103 and the right antenna 104 are asymmetrically provided with respect to the direction of the segment r or the angle Φ of the spherical coordinate system, each of the left antenna 103 and the right antenna 104 may have the omnidirectional radiation pattern in the θ direction.

More specifically, a distance $d_1$ between the image display device 100 and the first transmission tower 310, a distance $d_2$ between the image display device 100 and the second transmission tower 320, a distance $d_3$ between the image display device 100 and the third transmission tower 330 are greater than a distance $d_a$ between the left antenna 103 and the right antenna 104 ($d_1 \gg d_a$, $d_2 \gg d_a$, $d_3 \gg d_a$). Since the distance $d_a$ between the left antenna 103 and the right antenna 104 is negligibly less than the distance between the image display device 100 and the transmission tower, the left antenna 103 and the right antenna 104 may form a non-directional radiation pattern.

Figure 7:
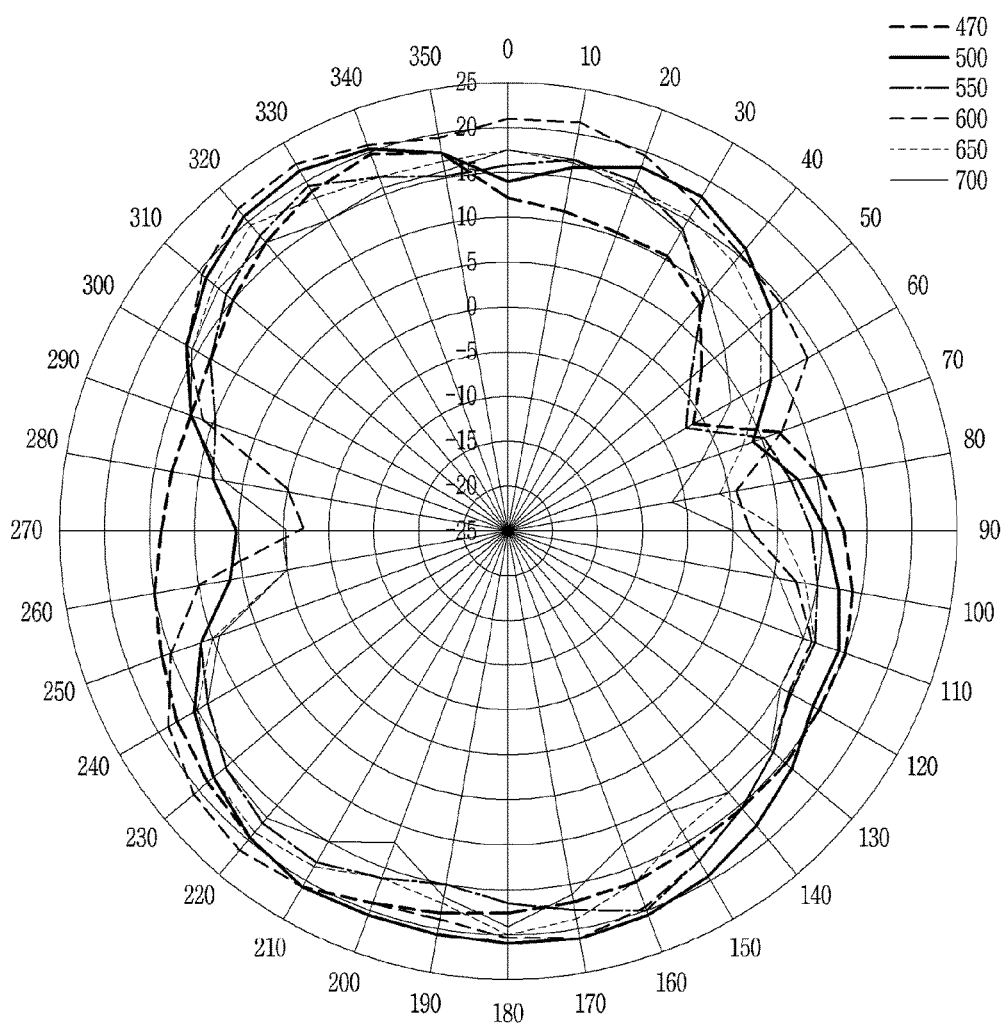
FIG. 7 is a diagram showing a radiation pattern of an upper antenna of an image display device according to an embodiment of the present invention.

FIG. 7 is a diagram showing a radiation pattern of an upper antenna of an image display device according to an embodiment of the present invention.

Referring to FIG. 7, it can be seen that the radiation pattern of the upper antenna 102 of the image display device 100 obtained according to test is bent in some directions but generally has omnidirectionality in a plurality of frequency bands. The radiation pattern may vary according to the test condition of the upper antenna 102 of FIG. 6.

Figure 8:
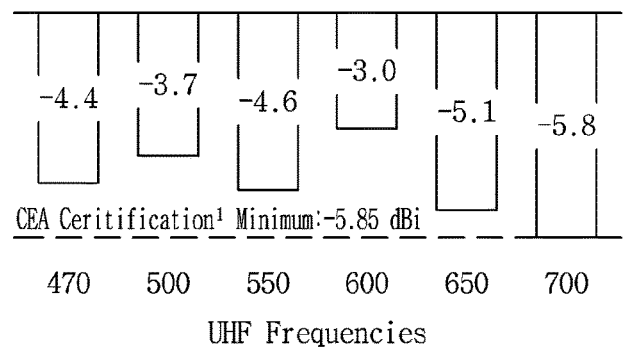
FIG. 8 is a diagram showing peak gain of an upper antenna of an image display device according to an embodiment of the present invention.

FIG. 8 is a diagram showing peak gain of an upper antenna of an image display device according to an embodiment of the present invention.

Referring to FIG. 8, it can be seen that the peak gain of a UHF frequency band according to the test of the upper antenna 102 of the image display device 100 exceeds −5.85 dBi which is an indoor antenna criterion of the Consumer Electronics Association (CEA). Therefore, it can be seen that the upper antenna 102 satisfies the indoor antenna criterion of the CEA. The test of the upper antenna 102 of FIG. 8 is performed when the received broadcast service is not amplified through the amplifier 105, and a result of measurement may be changed according to the test condition.

Meanwhile the antenna 10 of the image display device 100 according to the present invention may be moved in a predetermined range of the position of the antenna 101.

For example, the antenna 101 is provided in the case 108 of the image display device 100 in a slidable form to be moved from a predetermined position of the case 108 to another position.

As another example, the antenna 101 may be connected to a rail member (not shown) on the case 108 of the image display device 100 to be moved from the predetermined position of the case 108 to another position according to movement of the connected rail member. Here, the rail member may be formed of a non-conductive material.

The slidable form and the rail member are already known and thus will be omitted.

Hereinafter, position movement of the antenna 101 will be described with reference to FIGS. 9 to 16.

First, position movement of the upper antenna 102 will be described.

Figure 9:
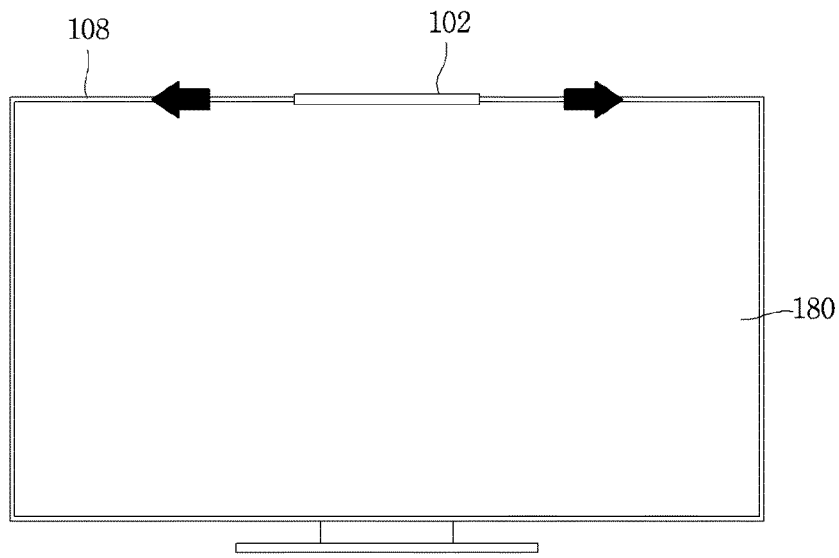
FIG. 9 is a diagram showing the concept of position movement of an upper antenna according to an embodiment of the present invention.

FIG. 9 is a diagram showing the concept of position movement of an upper antenna according to an embodiment of the present invention.

Figure 10:
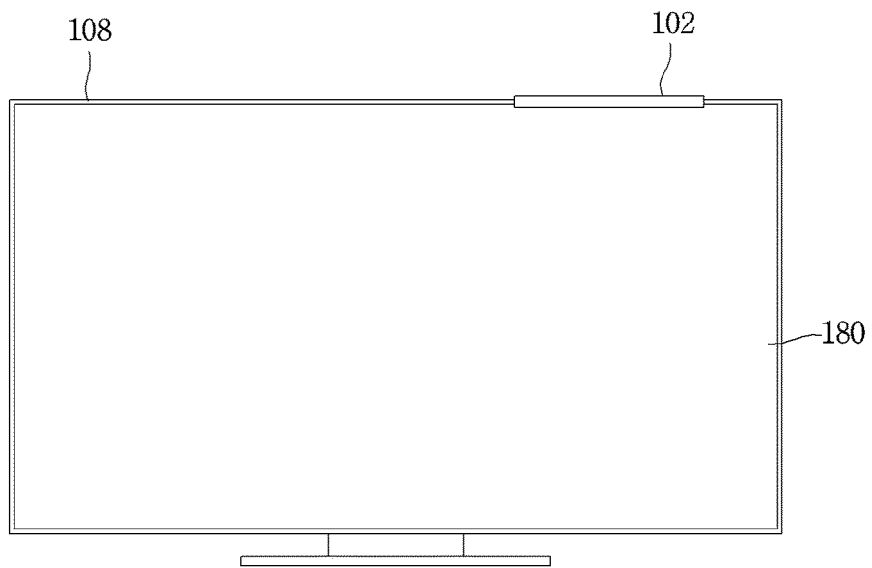
FIG. 10 is a diagram showing the concept of a moved upper antenna according to an embodiment of the present invention.

FIG. 10 is a diagram showing the concept of a moved upper antenna according to an embodiment of the present invention.

Figure 11:
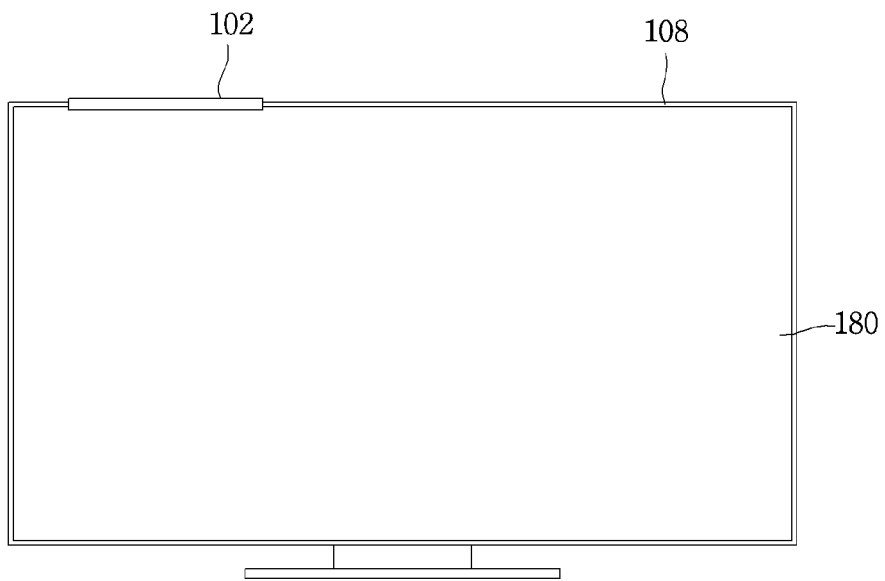
FIG. 11 is a diagram showing the concept of a moved upper antenna according to another embodiment of the present invention.

FIG. 11 is a diagram showing the concept of a moved upper antenna according to another embodiment of the present invention.

The position of the upper antenna 102 may be moved at the upper end of the case 108 of the image display device 100.

Referring to FIG. 9, the position of the upper antenna 102 may be moved in a predetermined range of the upper end of the case 108 of the image display device 100. The upper antenna 102 may be moved at the upper end of the image display device 100 in the left direction or the right direction.

For example, referring to FIG. 10, the position of the upper antenna 102 may be changed. Accordingly, the upper antenna 102 may be located at the right side of the upper end of the case 108.

As another example, referring to FIG. 11, the position of the upper antenna 102 may be changed. Accordingly, the upper antenna 102 may be located at the left side of the upper end of the case 108.

The positions of the left antenna 103 and the right antenna 104 may be moved at the side surface of the case 108 of the image display device 100. This will be described with respect to FIGS. 12 to 15.

Figure 12:
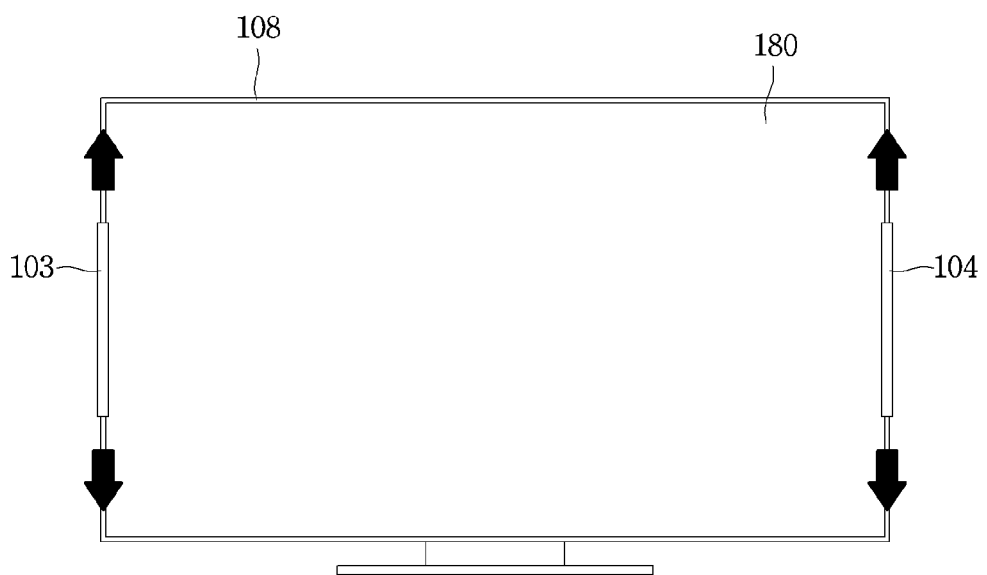
FIG. 12 is a diagram showing the concept of position movement of a left antenna and a right antenna according to an embodiment of the present invention.

FIG. 12 is a diagram showing the concept of position movement of a left antenna and a right antenna according to an embodiment of the present invention.

Figure 13:
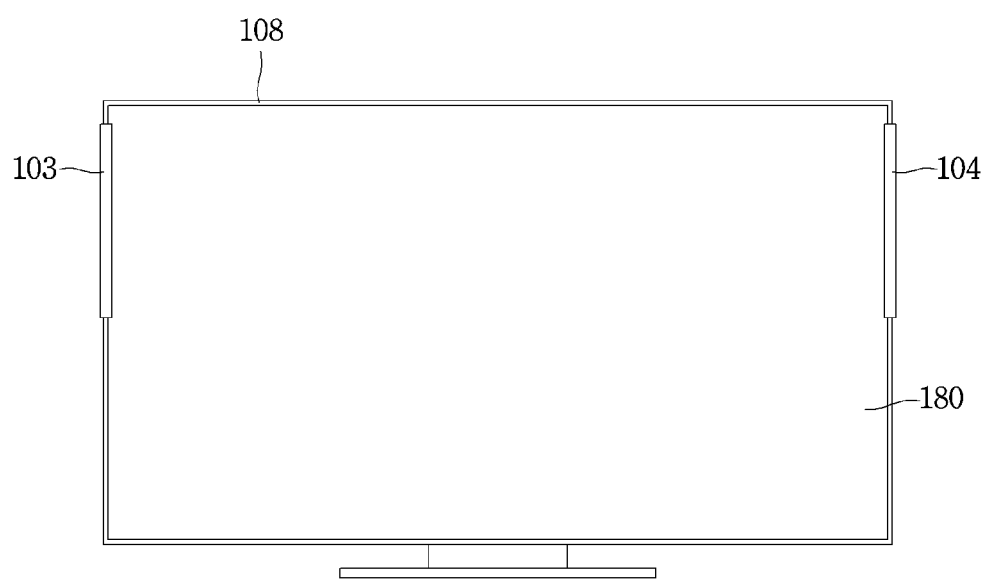
FIG. 13 is a diagram showing the concept of a moved left antenna and right antenna according to an embodiment of the present invention.

FIG. 13 is a diagram showing the concept of a moved left antenna and right antenna according to an embodiment of the present invention.

Figure 14:
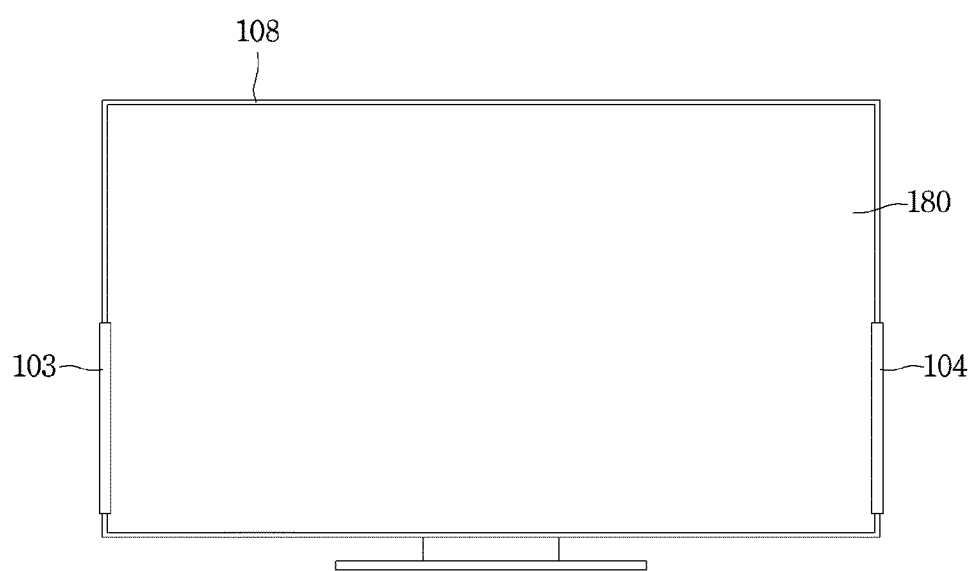
FIG. 14 is a diagram showing the concept of a moved left antenna and right antenna according to another embodiment of the present invention.

FIG. 14 is a diagram showing the concept of a moved left antenna and right antenna according to another embodiment of the present invention.

Figure 15:
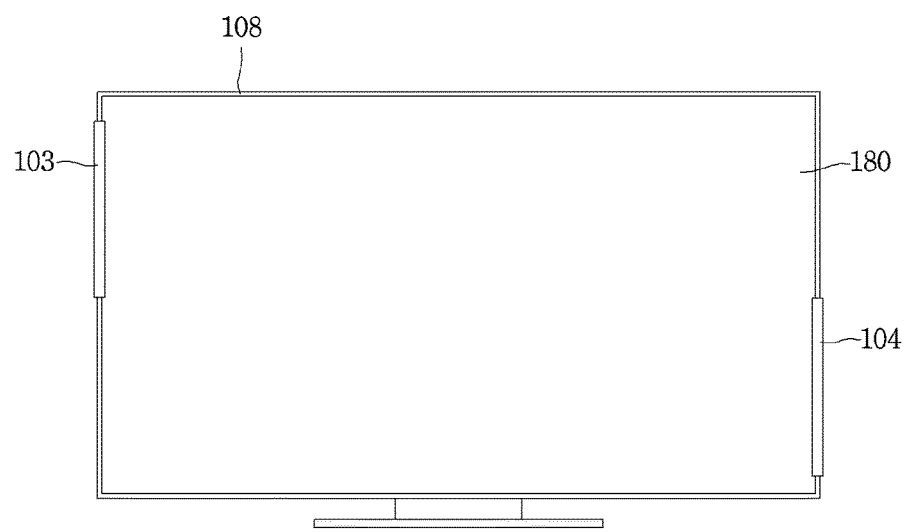
FIG. 15 is a diagram showing the concept of a moved left antenna and right antenna according to another embodiment of the present invention.

FIG. 15 is a diagram showing the concept of a moved left antenna and right antenna according to another embodiment of the present invention.

Referring to FIG. 12, the positions of the left antenna 103 and the right antenna 104 may be moved in a predetermined range of the side surface of the case 108 of the image display device 100. The left antenna 103 and the right antenna 104 may be moved at the side surface of the image display device 100 in an upper direction or a lower direction.

For example, referring to FIG. 13, the positions of the left antenna 103 and the right antenna 104 may be changed. Accordingly, each of the left antenna 103 and the right antenna 104 may be located at the upper end of the side surface of the case 108.

As another example, referring to FIG. 14, the positions of the left antenna 103 and the right antenna 104 may be changed. Accordingly, each of the left antenna 103 and the right antenna 104 may be located at the lower end of the side surface of the case 108.

Meanwhile, the left antenna 103 and the right antenna 104 may be located at positions asymmetrical to each other. This will be described with reference to FIG. 15.

Referring to FIG. 15, the position of the left antenna 103 may be moved and located at the upper end of the side surface of the case 108. The position of the right antenna 104 may be moved and located at the lower end of the side surface of the case 108.

The position of the antenna 101 is exemplary and the present invention is not limited thereto. Therefore, the antenna 101 may be located at various positions of the image display device 100.

Meanwhile, the antenna 101 may have a predetermined length and may be surrounded by a non-conductive material.

In addition, an insulation material may be provided between the antenna 101 and the case 108. Therefore, the antenna 101 may not be influenced by the case 108 or the other components of the image display device 100, thereby preventing the broadcast service signal from being lost.

In addition, the antenna 101 may be electrically connected to the amplifier 105 or the tuner 131 to deliver the received broadcast service signals.

At this time, the length of a line electrically connecting the antenna 101 and the amplifier 105 or the antenna 101 and the tuner 131 may be fixed.

The amplifier 105 may amplify the received broadcast service signals.

The amplifier 105 may amplify the levels of the broadcast service signals received through the antenna 101.

The amplifier 150 may deliver the amplified broadcast service signals to the tuner 131.

The audio acquisition unit 110 may acquire audio.

The audio acquisition unit 110 may include at least one microphone and acquire the audio through the microphone. The audio acquisition unit 110 may deliver the acquired audio to the control unit 170.

The video acquisition unit 120 may acquire video.

The video acquisition unit 120 may include at least one camera and acquire the video through the camera.

The video acquisition unit 120 may deliver the acquired video to the control unit 170.

The broadcast reception unit 130 can include a tuner 131, a demodulation unit 132, and a network interface unit 133.

The tuner 131 may tune to the broadcast service signal of a desired channel among the received broadcast service signals. The tuner 131 may down-convert the received broadcast service signal into an intermediate frequency (IF) signal and output the IF signal to the demodulation unit 132.

In addition, the tuner 131 may receive a real-time stream and a non-real-time stream.

The demodulation unit 132 performs automatic gain control, carrier restoration, timing restoration, etc. with respect to the digital IF signal of a passband received from the tuner 131 to perform conversion into a baseband signal, and performs channel equalization.

The data demodulated and channel-equalized by the demodulation unit 132 may be output in the form of MPEG-2 transport stream (TS) packets.

The network interface unit 133 can provide an interface for connecting the image display device 100 to a wired/wireless network including internet network. The network interface unit 133 can transmit or receive data to or from another user or another electronic device through an accessed network or another network linked to the accessed network.

Additionally, some content data stored in the image display device 100 can be transmitted to a user or an electronic device, which is selected from other users or other electronic devices pre-registered in the image display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The external device interface unit 135 can receive an application or an application list in an adjacent external device and deliver it to the control unit 170 or the storage unit 140.

The storage unit 140 can store signal-processed image, voice, or data signals stored by a program in order for each signal processing and control in the control unit 170.

Additionally, the storage unit 140 can perform a function for temporarily store image, voice, or data signals output from the external device interface unit 135 or the network interface unit 133 and can store information on a predetermined image through a channel memory function.

The storage unit 140 can store an application or an application list inputted from the external device interface unit 135 or the network interface unit 133.

The image display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (UWB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

The communication unit 160 may include one or more modules enabling wired communication or wireless communication between the image display device 100 and a network or the image display device 100 and a server (not shown). The communication unit 160 may perform wired communication or wireless communication with a gateway (not show) and perform wired communication or wireless communication with the server (not shown).

For example, the communication unit 160 may include an Internet module for Internet access and enable the image display device 100 to access the Internet using the Internet module through wired or wireless communication.

As another example, the communication unit 160 may include a short-range communication module enabling wireless communication between the image display device 100 and another device. In one embodiment, the short-range communication module included in the communication unit 160 may use Bluetooth, radio frequency identification (RFID), infrared data association (IrDA), ultra wideband (UWB), ZigBee, wireless LAN (WLAN)(Wi-Fi), near field communication (NFC), etc.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be output to the audio output unit 185. Additionally, voice signals processed in the control unit 170 can be inputted to an external output device through the external device interface unit 135.

Besides that, the control module 170 can control overall operations in the image display device 100.

In addition, the control unit 170 may acquire user input through the user input interface 150. For example, the control unit 170 may acquire a user input value through the user input interface 150. Here, the user input value may mean the number of times of pressing a specific button, the number of times of movement in one direction of a specific wheel key, etc.

Additionally, the control unit 170 can control the image display device 100 by a user command or internal program inputted through the user input interface unit 150 and download a desired application or application list into the image display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output unit 185.

Moreover, the control unit 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the image display device 100, received broadcast content, and external input content inputted from the outside, and the content can be in various formats such as broadcast images, external input images, audio files, still images, accessed web screens, and document files.

The display unit 180 can convert image signals, data signals, or OSD signals, which are processed in the control unit 170, or images signals or data signals, which are received in the external device interface unit 135, into R, G, and B signals to generate driving signals.

Furthermore, the image display device 100 shown in FIG. 1 is just one embodiment of the present invention and thus, some of the components shown can be integrated, added, or omitted according to the specification of the actually implemented image display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the image display device 100 can receive images through the network interface unit 133 or the external device interface unit 135 and play them without including the tuner 131 and the demodulation unit 132.

For example, the image display device 100 can be divided into an image processing device such as a set-top box for receiving broadcast signals or contents according to various network services and a content playback device for playing contents inputted from the image processing device.

In this case, an operating method of an image display device according to an embodiment of the present invention described below can be performed by one of the image display device described with reference to FIG. 1, an image processing device such as the separated set-top box, and a content playback device including the display unit 180 and the audio output unit 185.

Figure 16:
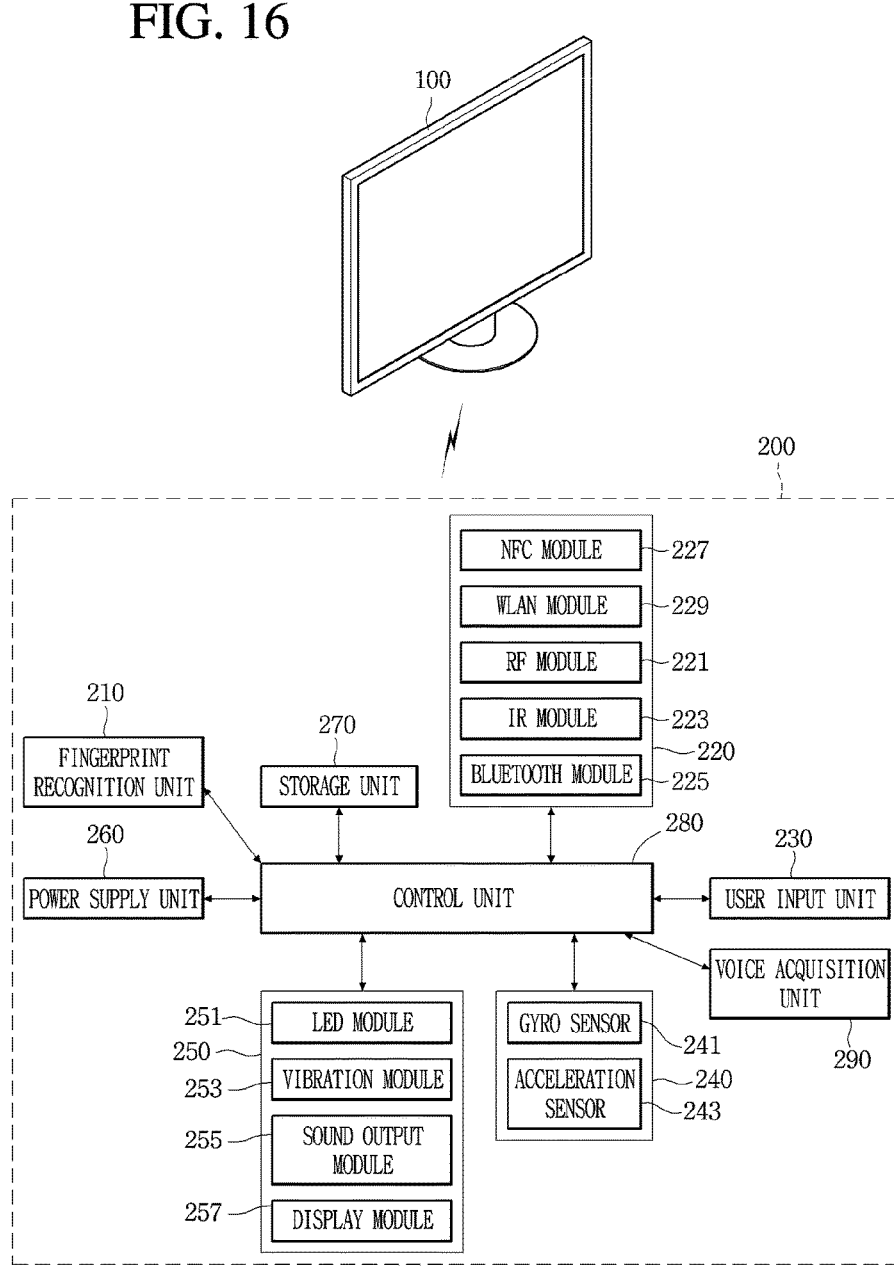
FIG. 16 is a block diagram of a remote control device according to an embodiment of the present invention.
Figure 17:
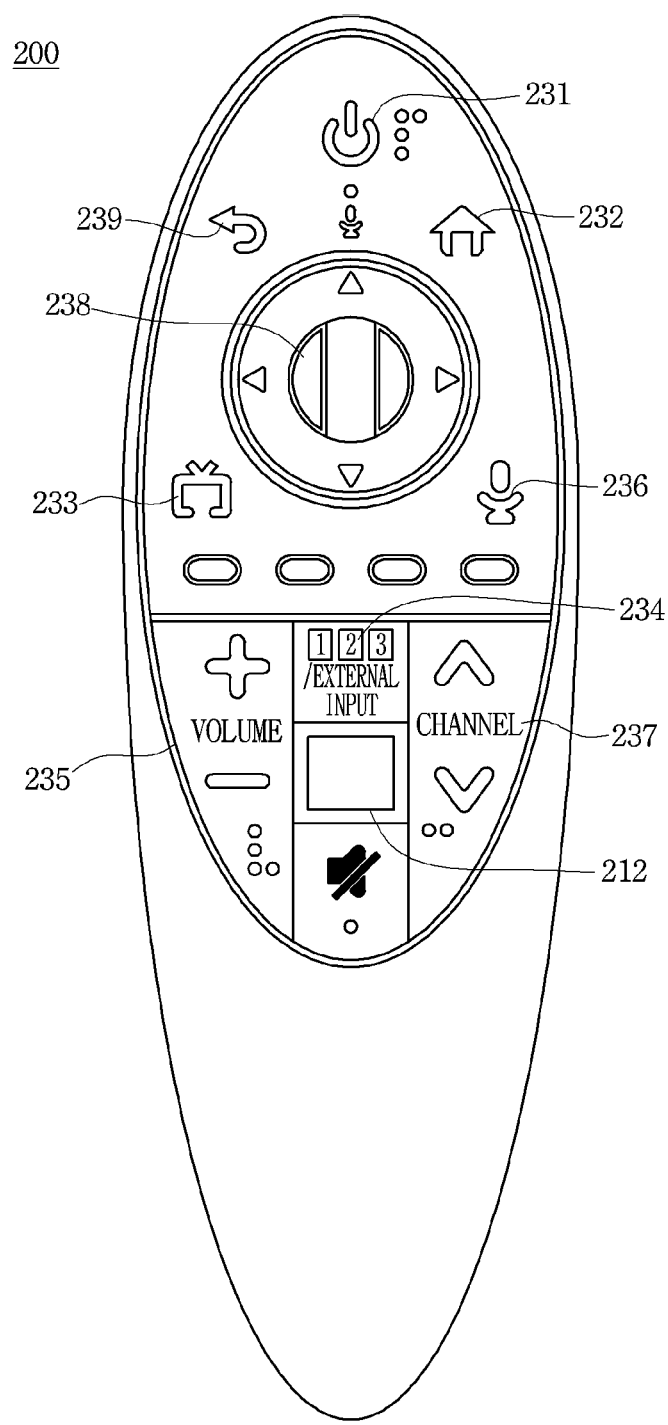
FIG. 17 is a diagram showing an actual configuration example of a remote control device according to an embodiment of the present invention.

Then, referring to FIGS. 16 and 17, a remote control device is described according to an embodiment of the present invention.

FIG. 16 is a block diagram illustrating a remote control device according to an embodiment of the present invention and FIG. 17 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

The wireless communication unit 220 transmits/receives signals to/from an arbitrary any one of image display devices according to the above-mentioned embodiments of the present invention.

The remote control device 200 can include an RF module 221 for transmitting/receiving signals to/from the image display device 100 according to the RF communication standards and an IR module 223 for transmitting/receiving signals to/from the image display device 100 according to the IR communication standards. Additionally, the remote control device 200 can include a Bluetooth module 225 for transmitting/receiving signals to/from the image display device 100 according to the Bluetooth communication standards. Additionally, the remote control device 200 can include an NFC module 227 for transmitting/receiving signals to/from the image display device 100 according to the Near Field Communication (NFC) communication standards and a WLAN module 229 for transmitting/receiving signals to/from the image display device 100 according to the Wireless LAN (WLAN) communication standards.

Additionally, the remote control device 200 can transmit signals containing information on a movement of the remote control device 200 to the image display device 100 through the wireless communication unit 220.

Meanwhile, the remote control device 200 may receive the signal transmitted by the image display device 100 through the wireless communication unit 220 and may transmit a command related to power on/off, channel change, volume change, etc. to the image display device 100 through the wireless communication unit 220 as necessary.

The user input unit 230 can be configured with a keypad button, a touch pad, or a touch screen. A user can manipulate the user input unit 230 to input a command relating to the image display device 100 to the remote control device 200. If the user input unit 230 includes a hard key button, a user can input a command relating to the image display device 100 to the remote control device 200 through the push operation of the hard key button. This will be described with reference to FIG. 17.

Referring to FIG. 17, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a wheel button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation.

The power button 231 can be button for turning on/off the power of the image display device 100.

The home button 232 may be used to display the basic menu of the image display device 100.

The live button 233 can be a button for displaying live broadcast programs.

The external input button 234 can be button for receiving an external input connected to the image display device 100.

The voice adjustment button 235 can be button for adjusting the size of a volume output from the image display device 100.

The voice recognition button 236 can be a button for receiving user's voice and recognizing the received voice.

The channel change button 237 can be a button for receiving broadcast signals of a specific broadcast channel.

The wheel key 238 may be a wheel-shaped key for receiving user input for movement in one or more directions. For example, the wheel key 238 may a wheel-shaped for receiving user input for movement in upper and lower directions or upper, lower, left and right directions. In addition, the wheel key 238 may further include a directional key. User input for movement in the upper and lower directions of the wheel key 238 may be user input for rotating the wheel key 238 and user input for movement in left and right directions may be user input for tilting the wheel key 238. In addition, the wheel key 238 may receive push input.

Again, FIG. 16 is described.

If the user input unit 230 includes a touch screen, a user can touch a soft key of the touch screen to input a command relating to the image display device 100 to the remote control device 200.

Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the image display device 100.

The output unit 250 can output image or voice signals corresponding to a manipulation of the user input unit 235 or corresponding to signals transmitted from the image display device 100. A user can recognize whether the user input unit 235 is manipulated or the image display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the image display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the image display device 100 and the RF module 221, the remote control device 200 and the image display device 100 transmits/receives signals through a predetermined frequency band.

The control unit 280 of the remote control device 200 can store, in the storage unit 270, information on a frequency band for transmitting/receiving signals to/from the image display device 100 paired with the remote control device 200 and refer to it.

The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the image display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

The audio acquisition unit 290 may deliver the acquired audio to the controller 280.

A method of operating an image display device will be described with reference to FIG. 18.

Figure 18:
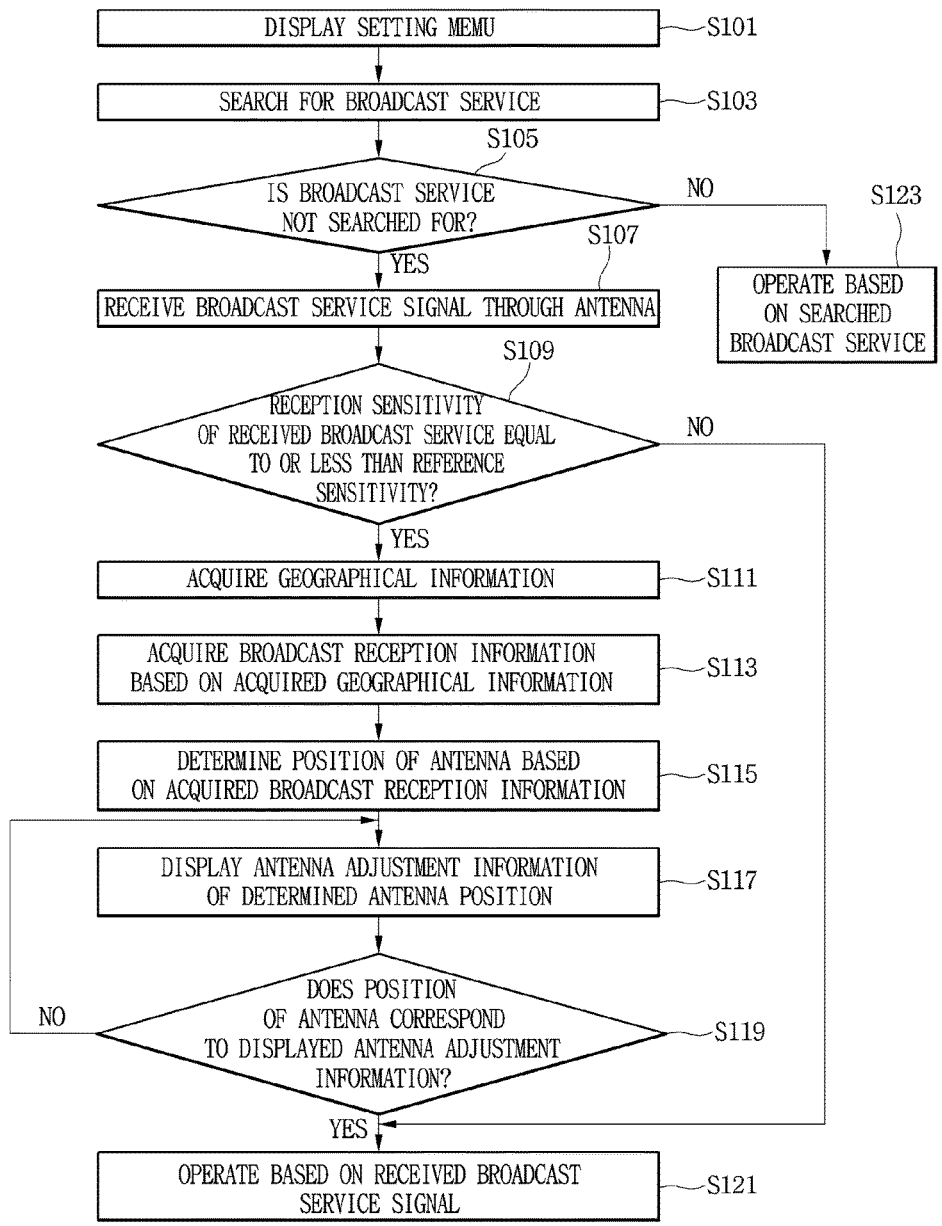
FIG. 18 is a flowchart illustrating a method of operating an image display device according to an embodiment of the present invention.

FIG. 18 is a flowchart illustrating a method of operating an image display device according to an embodiment of the present invention.

Referring to FIG. 18, the control unit 170 of the image display device 100 displays a setting menu on the display unit 180.

The control unit 170 may display the setting menu for operation of the image display device 100 on the display unit 180. Here, the setting menu for operation of the image display device 100 may include a setting menu for a broadcast service to be displayed on the image display device 100.

In one embodiment, the control unit 170 may display the setting menu on the display unit 180 based on user input for displaying the setting menu.

In another embodiment, the control unit 170 may display the setting menu on the display unit 180 when the image display device 100 is initially turned on.

The control unit 170 searches for a broadcast service received by the image display device (S103).

In one embodiment, the control unit 170 may search for one or more broadcast services through one or more of the network interface 133, the external device interface 135 and the communication unit 160.

When the broadcast service is not searched for (S105), the control unit 170 receives a broadcast service signal through the antenna 101 (S107).

In one embodiment, the control unit 170 may receive the broadcast service signal, upon determining that there is no broadcast service received through one or more of the network interface 133, the external device interface 135 and the communication unit 160.

Therefore, the antenna 101 may receive the broadcast service signal from the transmission tower 300.

In one embodiment, the antenna 101 may receive a very high frequency (VHF) or ultra high frequency (UHF) broadcast service signal.

Here, the antenna 101 may be one or more of the upper antenna 102, the left antenna 103 and the right antenna 104.

Meanwhile, when the broadcast service is searched for (S105), the control unit 170 operates based on the searched broadcast service (S123).

For example, the control unit 170 may receive the broadcast service signal corresponding to the searched broadcast service and display a broadcast service screen according to the received broadcast service signal on the display unit 180. The broadcast service audio according to the received broadcast service signal may be output through the audio output unit 185.

Here, the searched broadcast service may mean a broadcast service received through the cable, the satellite, etc. or a paid broadcast service. For example, the searched broadcast service may include an IPTV service or an over the top (OTT) service.

The control unit 170 determines whether the reception sensitivity of the received broadcast service signal is equal to or less than reference sensitivity (S109) and acquires geographical information upon determining that the reception sensitivity of the received broadcast service signal is equal to or less than reference sensitivity (S111).

The control unit 170 may determine whether the reception sensitivity of the broadcast service signal received through the antenna 101 is equal to or less than reference sensitivity and acquire geographical information of an area where the image display device 100 is located upon determining that the reception sensitivity of the received broadcast service signal is equal to or less than reference sensitivity. Here, the geographical information may include position information indicating a geographical position. Here, the reception sensitivity of the broadcast service signal may mean an antenna gain unit. For example, the unit of the reception sensitivity of the broadcast service signal may be dBi.

For example, when the reception sensitivity of one or more of a plurality of frequency bands included in the received broadcast service signal is equal to or less than reference sensitivity, the control unit 170 may acquire geographical information of the area where the image display device 100 is located.

In one embodiment, the control unit 170 may acquire geographical information of the area where the image display device 100 is located, based on user input for geographical information. For example, the control unit 170 may acquire the zip code of the area where the image display device 100 is located from the user and acquire geographical information based on the acquired zip code.

In another embodiment, the control unit 170 may acquire geographical information of the area where the image display device 100 is located through the network interface 133. For example, the control unit 170 may acquire geographical information of the area where the image display device 100 is located, based on an Internet Protocol (IP) address.

In another embodiment, the control unit 170 may acquire geographical information of the area where the image display device 100 is located through a GPS module (not shown).

Meanwhile, the control unit 170 operates based on the broadcast service signal received through the antenna 101 (S121), when the reception sensitivity of the received broadcast service signal exceeds the reference sensitivity (S109). The control unit 170 may display a broadcast service screen according to the received broadcast service signal on the display unit 180. The broadcast service audio according to the received broadcast service signal may be output through the audio output unit 185.

The control unit 170 acquires broadcast reception information based on the acquired geographical information (S113).

The control unit 170 may acquire broadcast reception information of the area where the image display device 100 is located, based on the acquired geographical information.

Here, the broadcast reception information may include information on the position of the communication tower 300, the distance from the communication tower 300 and the direction of the communication tower 300 and may include information on a broadcast service signal receivable in the area where the image display device 100 is located. Here, the information on the receivable broadcast service signal may include a broadcast service receivable at a corresponding position and the intensity information of the broadcast service signal.

The control unit 170 determines the position of the antenna corresponding to the broadcast reception information based on the acquired broadcast reception information (S115).

The control unit 170 may determine the position of the antenna 101 corresponding to the broadcast reception information based on the acquired broadcast reception information. Here, the position of the antenna 101 corresponding to the broadcast reception information may mean a position where the reception sensitivity of the received broadcast service signal is highest.

In one embodiment, the control unit 170 may determine the position of the antenna 101 including the direction of the communication tower 300 for transmitting the broadcast service signal based on the acquired broadcast reception information.

In another example, the control unit 170 may determine the position of the antenna 101 for avoiding a condition interrupting broadcast service reception between the communication tower 300 and the antenna 101, based on the acquired broadcast reception information. Here, the condition interrupting broadcast service reception means a condition interrupting broadcast service signal reception of the antenna 101, such as a wall or a conductive object located near the antenna 101.

Meanwhile, the control unit 170 may determine the position of the antenna 101 corresponding to the position of each of the plurality of communication towers 300. The control unit 170 may determine the position of the antenna 101 having highest reception sensitivity among the positions of the antenna 101 corresponding to the positions of the plurality of communication towers 300.

Meanwhile, when the image display device 100 includes a plurality of antennas, that is, the left antenna 103 and the right antenna 104, the control unit 170 may determine the position of each of the left antenna 103 and the right antenna 104. The control unit 170 may determine that the positions of the left antenna 103 and the right antenna 104 are symmetrical or asymmetrical.

The control unit 170 displays antenna adjustment information of the determined antenna position on the display unit 180 (S117).

The control unit 170 may display the antenna adjustment information of the determined antenna position on the display unit 180. Here, the antenna adjustment information may include information enabling the antenna 101 to be located at the determined antenna position.

Therefore, the control unit 170 may display the antenna adjustment information for enabling the antenna 101 to be located at the determined antenna position on the display unit 180, based on the current position of the antenna 101 and the determined antenna position.

This will be described with reference to FIGS. 19 to 21.

Figure 19:
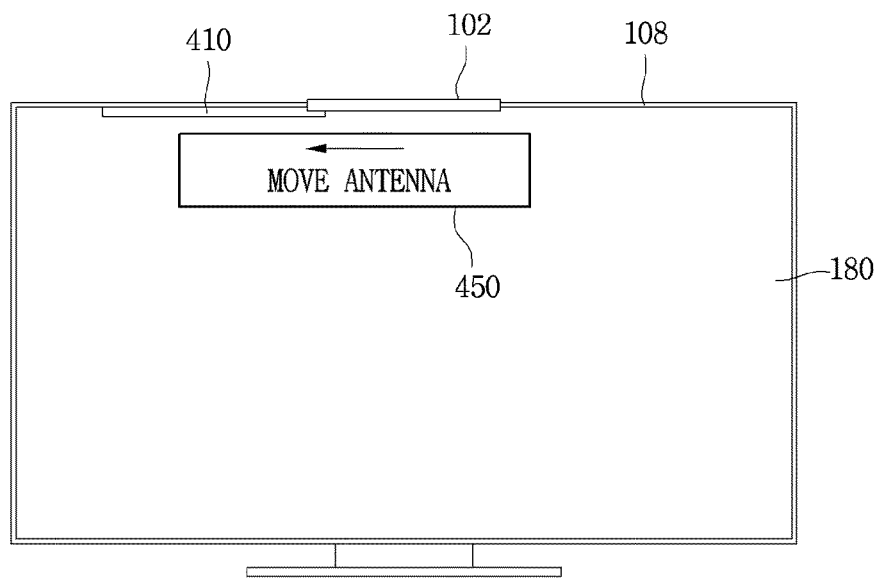
FIG. 19 is a diagram showing display of antenna adjustment information according to an embodiment of the present invention.

FIG. 19 is a diagram showing display of antenna adjustment information according to an embodiment of the present invention.

Referring to FIG. 19, the control unit 170 may display a first antenna position icon 410, which is adjustment information of the determined antenna position of the upper antenna 102, and an adjustment information window 450 on the display unit 180. Here, the first antenna position icon 410 may indicate a first position which is the position of the upper antenna 102 corresponding to the determined antenna position. The adjustment information window 450 may include adjustment information of the upper antenna 102 corresponding to the determined antenna position. The control unit 170 may display an arrow indicating the movement direction of the upper antenna 102 and guide information indicating movement of the upper antenna 102 in the adjustment information window 450. Therefore, the control unit 170 may display the first antenna position icon 410 corresponding to the first position and the arrow indicating a left direction corresponding to the first position on the display unit 180.

Figure 20:
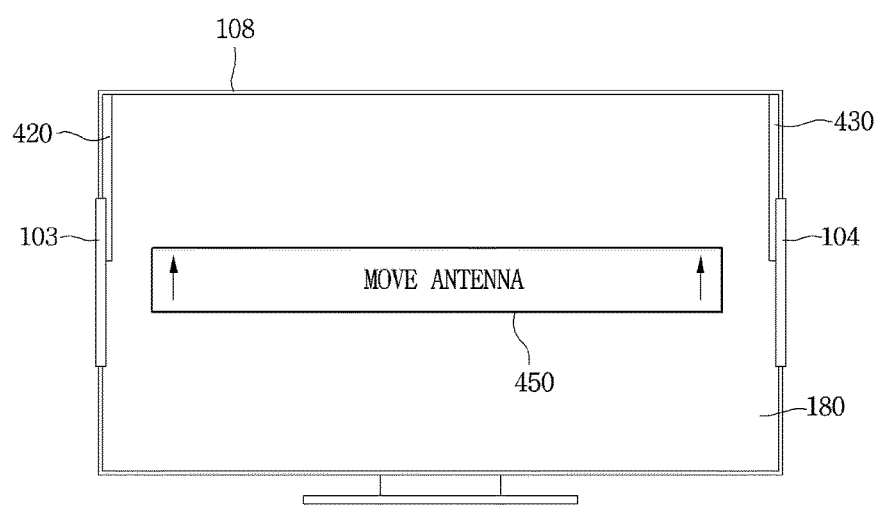
FIG. 20 is a diagram showing display of antenna adjustment information according to another embodiment of the present invention.

FIG. 20 is a diagram showing display of antenna adjustment information according to another embodiment of the present invention.

Referring to FIG. 20, the control unit 170 may display a second antenna position icon 420, which is adjustment information of the determined antenna position of the left antenna 103, a third antenna position icon 430 which is adjustment information of the determined antenna position of the right antenna 104 and an adjustment information window 450 on the display unit 180. Here, the second antenna position icon 420 may indicate the position of the left position 103 corresponding to a second position which is the determined antenna position. The third antenna position icon 430 may indicate the position of the right position 104 corresponding to a third position which is the determined antenna position. The adjustment information window 450 may include adjustment information of the left antenna 103 and the right antenna 104 corresponding to the determined antenna position. The control unit 170 may display arrows indicating the movement directions of the left antenna 103 and the right antenna 104 and guide information indicating movement of the left antenna 103 and the right antenna 104 in the adjustment information window 450. Therefore, the control unit 170 may display the second antenna position icon 420 corresponding to the second position, the third antenna position icon 430 corresponding to the third position, and the arrow indicating the upper direction corresponding to the second position and the third position on the display unit 180.

Figure 21:
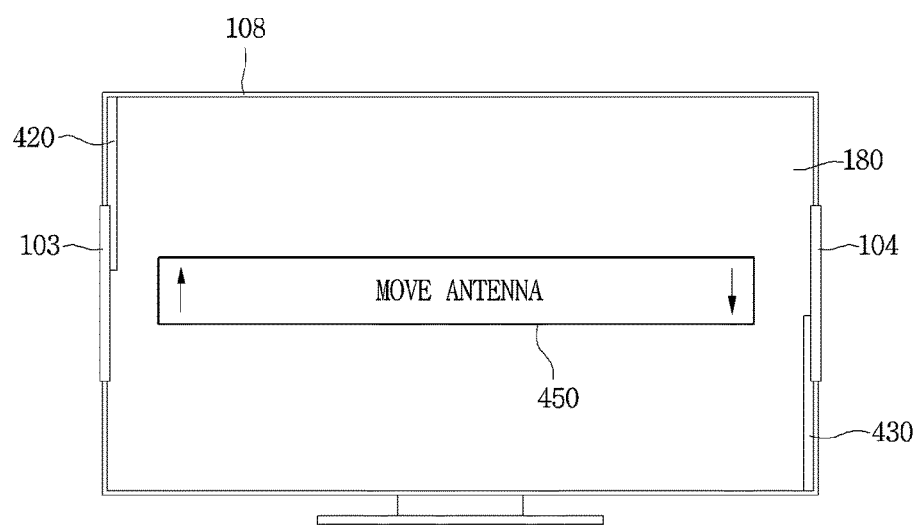
FIG. 21 is a diagram showing display of antenna adjustment information according to another embodiment of the present invention.

FIG. 21 is a diagram showing display of antenna adjustment information according to another embodiment of the present invention.

Referring to FIG. 21, the control unit 170 may display a second antenna position icon 420, which is adjustment information of the determined antenna position of the left antenna 103, a third antenna position icon 430 which is adjustment information of the determined antenna position of the right antenna 104 and an adjustment information window 450 on the display unit 180. Here, the second antenna position icon 420 may indicate the position of the left position 103 corresponding to a second position which is the determined antenna position. The third antenna position icon 430 may indicate the position of the right position 104 corresponding to a fourth position which is the determined antenna position. The adjustment information window 450 may include adjustment information of the left antenna 103 and the right antenna 104 corresponding to the determined antenna position. The control unit 170 may display arrows indicating the movement directions of the left antenna 103 and the right antenna 104 and guide information indicating movement of the left antenna 103 and the right antenna 104 in the adjustment information window 450. Therefore, the control unit 170 may display the second antenna position icon 420 corresponding to the second position, the third antenna position icon 430 corresponding to the fourth position, the arrow indicating the upper direction corresponding to the second position and the third position, and the arrow indicating the lower direction on the display unit 180.

Description of the display of the antenna adjustment information according to the determined antenna position is exemplary and the present invention is not limited thereto. The display of the antenna adjustment information may be variously set according to selection of a user or designer.

FIG. 18 will be referred to again.

The control unit 170 determines whether the position of the antenna 101 corresponds to the displayed antenna adjustment information (S119), and operates based on the broadcast service signal received through the antenna 101 (S121) when the position of the antenna 101 corresponds to the displayed antenna adjustment information.

The control unit 170 may determine whether the position of the antenna 101 corresponds to the antenna adjustment information displayed on the display unit 180.

For example, referring to FIG. 19, the control unit 170 may determine whether the position of the upper antenna 102 corresponds to the first antenna position icon 410.

As another example, referring to FIG. 20, the control unit 170 may determine whether the position of the left antenna 103 corresponds to the second antenna position icon 420 and determine whether the position of the right antenna 104 corresponds to the third antenna position icon 430.

In another example, referring to FIG. 21, the control unit 170 may determine whether the position of the left antenna 103 corresponds to the second antenna position icon 420 and determine whether the position of the right antenna 104 corresponds to the third antenna position icon 430.

The control unit 170 may determine whether the position of the antenna 101 corresponds to the determined antenna position.

The control unit 170 may operate based on the broadcast service signal received through the antenna 101, upon determining that the position of the antenna 101 corresponds to the determined antenna position.

For example, the control unit 170 may display the broadcast service screen according to the received broadcast service signal on the display unit 180. The broadcast service audio according to the received broadcast service signal may be output through the audio output unit 185.

According to various embodiments of the present invention, it is possible to improve reception sensitivity of a broadcast service signal through an antenna having omni-directionality.

In the present invention, since the position of the built-in antenna is movable, it is possible to locate the antenna at an optimal position for receiving a broadcast service signal.

In the present invention, since broadcast reception information for reception of the broadcast service signal may be provided, it is possible to adjust the position of the built-in antenna to the optimal position for receiving the broadcast service signal.

The present invention may be implemented as code that may be written on a computer readable recording medium and thus read by a computer. The computer readable recording medium may be any type of recording device in which data is stored in a computer readable manner. Examples of the computer readable recording medium may include HDD (Hard Disk Drive), SSD (Solid State Drive), SDD (Silicon Disk Drive), ROM, RAM, CD-ROM, a magnetic tape, a floppy disk, and an optical data storage device. If desired, the computer-readable medium may be realized in the form of a carrier wave (for example, a transmission over the Internet). The computer may include the control unit 170 of the image display device. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. An image display device comprising:
an antenna configured to receive a broadcast service signal;
a display unit configured to display a screen corresponding to the received broadcast service signal; and
a controller configured to:
determine whether reception sensitivity of the received broadcast service signal is less than or equal to a reference sensitivity for a current position of the antenna;
acquire broadcast reception information for receiving the broadcast service signal when the reception sensitivity of the received broadcast service signal is less than or equal to the reference sensitivity;
acquire a position of the antenna with a reception sensitivity greater than the reference sensitivity based on the acquired broadcast reception information; and
display information for changing the current position of the antenna to the acquired position of the antenna on the display unit.

2. The image display device according to claim 1, wherein the antenna is provided in one or more of an upper side, left side or a right side of the image display device.

3. The image display device according to claim 1, wherein the antenna is movable within a predetermined range of the acquired position.

4. The image display device according to claim 1, wherein the antenna is disposed in a bezel of the image display device.

5. The image display device according to claim 1, wherein the controller is further configured to acquire geographical information including position information of an area where the image display device is located and acquire broadcast reception information corresponding to the acquired geographical information.

6. The image display device according to claim 5, wherein the controller is further configured to acquire broadcast reception information including information on one or more of a position, direction, or distance of a transmission tower for transmitting the broadcast service signal in the area where the image display device is located.

7. The image display device according to claim 6, wherein the controller is further configured to determine a position of the antenna corresponding to the transmission tower and display the determined position of the antenna as the acquired position of the antenna.

8. The image display device according to claim 6, wherein the controller is further configured to determine the position of the antenna avoiding a condition interrupting reception of the broadcast service signal between the transmission tower and the antenna and display the determined position of the antenna as the acquired position of the antenna.

9. The image display device according to claim 1, wherein the controller is further configured to determine whether the current position of the antenna corresponds to the displayed acquired position of the antenna.

10. The image display device according to claim 9, wherein the controller is further configured to operate based on the broadcast service signal received through the antenna, when the current position of the antenna corresponds to the displayed acquired position of the antenna.

11. A method of operating an image display device, the method comprising:
receiving a broadcast service signal through an antenna of the image display device;
determining whether reception sensitivity of the received broadcast service signal is less than or equal to a reference sensitivity for a current position of the antenna;
acquiring broadcast reception information for receiving the broadcast service signal when the reception sensitivity of the received broadcast service signal is less than or equal to the reference sensitivity;
acquiring a position of the antenna with a reception sensitivity greater than the reference sensitivity based on the acquired broadcast reception information; and
displaying information for changing the current position of the antenna to the acquired position of the antenna.

12. The method according to claim 11, wherein the antenna is provided in one or more of an upper side, left side or a right side of the image display device.

13. The method according to claim 11, wherein the antenna is movable within a predetermined range of the acquired position.

14. The method according to claim 11, wherein the antenna is disposed in a bezel of the image display device.

15. The method according to claim 11, wherein the acquiring of the broadcast reception information for receiving the broadcast service signal includes:
acquiring geographical information including position information of an area where the image display device is located; and
acquiring broadcast reception information corresponding to the acquired geographical information.

16. The method according to claim 15, wherein the acquiring of the broadcast reception information corresponding to the acquired geographical information includes acquiring broadcast reception information including information on one or more of a position, direction, or distance of a transmission tower for transmitting the broadcast service signal in the area where the image display device is located.

17. The method according to claim 16, wherein
acquiring the position of the antenna includes acquiring the position of the antenna corresponding to the transmission tower.

18. The method according to claim 16, wherein
acquiring the position of the antenna includes acquiring the position of the antenna avoiding a condition interrupting reception of the broadcast service signal between the transmission tower and the antenna.

19. The method according to claim 11, further comprising determining whether the current position of the antenna corresponds to the displayed acquired position of the antenna.

20. The method according to claim 19, further comprising operating based on the broadcast service signal received through the antenna, when the current position of the antenna corresponds to the displayed acquired position of the antenna.

* * * * *